United States Patent
Augustsson et al.

(10) Patent No.: US 9,233,796 B2
(45) Date of Patent: Jan. 12, 2016

(54) TELESCOPIC ROLLER CONVEYOR AND FRAME

(75) Inventors: Per Augustsson, Göteborg (SE); Per Elvén, Göteborg (SE); Lars-Erik Rudell, Göborg (SE); Anders Rudell, Göteborg (SE)

(73) Assignee: FQ IP AB (SE)

(*) Notice: Subject to any disclaimer, the term of this patent is extended or adjusted under 35 U.S.C. 154(b) by 59 days.

(21) Appl. No.: 13/981,985

(22) PCT Filed: Jan. 27, 2012

(86) PCT No.: PCT/SE2012/000008
§ 371 (c)(1),
(2), (4) Date: Jul. 26, 2013

(87) PCT Pub. No.: WO2012/102660
PCT Pub. Date: Aug. 2, 2012

(65) Prior Publication Data
US 2013/0306432 A1    Nov. 21, 2013

(30) Foreign Application Priority Data
Jan. 28, 2011  (SE) ...................................... 1100062

(51) Int. Cl.
*B65G 13/12*   (2006.01)
*B65G 13/11*   (2006.01)

(52) U.S. Cl.
CPC ............... *B65G 13/11* (2013.01); *B65G 13/12* (2013.01)

(58) Field of Classification Search
CPC ................................ B65G 13/11; B65G 13/12
USPC .............................................. 193/35 R, 35 TE
See application file for complete search history.

(56) References Cited

U.S. PATENT DOCUMENTS 3,420,348 A   1/1969   Caudell et al.
3,890,755 A   6/1975   Specht
(Continued)

FOREIGN PATENT DOCUMENTS

EP     1707509      10/2006
GB     1181512      2/1970
WO     2002051726   7/2002

OTHER PUBLICATIONS

Written Opinion for PCT/SE2012/000008 mailed May 9, 2012.
(Continued)

*Primary Examiner* — Gene Crawford
*Assistant Examiner* — Thomas Randazzo
(74) *Attorney, Agent, or Firm* — Calfee, Halter & Griswold LLP

(57) ABSTRACT

A telescopic roller conveyor is provided, the telescopic roller conveyor comprises an inner profile (1) and an outer profile (2). The inner profile (1) is adapted to slide inside the outer profile (2) such that a telescopic functionality is achieved. The inner (1) and outer (2) profiles each have a first side (3) comprising: at least one first recess (8) adapted to partly contain at least one roller organ (6) and at least one second recess (4) adapted to receive an axle (5) connected to the roller organ (6). The axle (5) is adapted to lock the inner (1) and outer (2) profiles to each other in the length axis of the profiles (1;2) when the axle (5) is placed in the recess (4). A telescopic roller conveyor frame is also provided.

13 Claims, 6 Drawing Sheets

(56) References Cited

U.S. PATENT DOCUMENTS

| | | | | |
|---|---|---|---|---|
| 3,915,275 A * | 10/1975 | Specht | ............ | B65G 39/12 |
| | | | | 193/35 R |
| 4,239,100 A | 12/1980 | Corey | | |
| 4,295,560 A * | 10/1981 | Cross | ............ | B65G 65/12 |
| | | | | 198/517 |
| 4,366,894 A * | 1/1983 | Huelster | ............ | B65G 13/11 |
| | | | | 193/35 R |
| 4,411,349 A * | 10/1983 | Stedman | ............ | B65G 13/11 |
| | | | | 193/35 R |
| 4,640,404 A * | 2/1987 | Bigott | ............ | B65G 13/12 |
| | | | | 193/35 TE |
| 4,765,493 A * | 8/1988 | Kinney | ............ | B65G 1/023 |
| | | | | 193/35 R |
| 5,482,422 A * | 1/1996 | Hammond | ............ | B65G 1/06 |
| | | | | 211/151 |
| 5,664,657 A * | 9/1997 | Neukam | ............ | B65G 13/11 |
| | | | | 193/35 R |
| 7,090,064 B2 * | 8/2006 | Lutz | ............ | B65G 13/12 |
| | | | | 193/35 R |
| 2002/0112937 A1 * | 8/2002 | Lutz | ............ | B62B 3/02 |
| | | | | 193/37 |
| 2003/0230467 A1 | 12/2003 | Diego | | |
| 2005/0115809 A1 * | 6/2005 | Lutz | ............ | B65G 13/12 |
| | | | | 198/860.1 |
| 2012/0074088 A1 * | 3/2012 | Dotson | ............ | B65G 1/023 |
| | | | | 211/151 |

OTHER PUBLICATIONS

International Search Report for PCT/SE2012/000008 mailed May 9, 2012.

* cited by examiner

TELESCOPIC ROLLER CONVEYOR AND FRAME

CROSS-REFERENCE TO RELATED APPLICATIONS

This application is the U.S. national phase entry of PCT/SE2012/000008, with an international filing date of 27 Jan. 2012, which claims the benefit of Swedish patent application no. 1100062-7, with a filing date of 28 Jan. 2011, the entire disclosures of which are fully incorporated herein by reference.

TECHNICAL AREA

The present invention relates to technology for transportation of goods, packaging, material etc. in e.g. warehouses and at assembly stations, by means of gravity.

BACKGROUND

Roller conveyors are used in many different applications for, by means of gravity, moving objects from one position to another. In e.g. material racks, roller conveyors are used to transport packaging from the loading station to the consumption station.

When new products are introduced and will start production or when production volumes change, there is a need to rebuild the material facade at a production line and at warehouses where production items are stored. I.e., the material racks and other material handling systems along the production line or in the warehouse must be adjusted to store new types of packaging and to handle new buffer level (number of packages).

Product changes and volume changes occur with more frequent interval, and today's roller conveyors, which e.g. is s part of a material rack, are not flexible enough to quickly, easily and cost effectively adapt to the new conditions. Adjustment means the possibility to adjust the roller conveyor's length and the ability to easily replace the wheels of the roller conveyor in order for the roller conveyor to handle new types of packaging.

Today's roller conveyors consist of a steel profile in which a number of wheels with axles are fixed directly to the steel profile. The roller conveyors are sold and delivered in predefined standard lengths. This means that the roller conveyors must be cut to the right length at the end user to fit the desired application. When the user wants to rebuild e.g. a material rack, for example by making it deeper, it means that the roller conveyors must be extended and then new roller conveyors with the correct length must be purchased.

If the user would like to reduce the depth, the roller conveyors must be cut to the correct length, which often results in waste of the roller conveyors that are difficult to reuse.

When the wheels of the roller conveyor need to be replaced, e.g. switching from plastic wheels to steel wheels, wheel for wheel in the steel profile must be replaced, which takes a very long time, at the same time as it interrupts the production. This results in that the wheels are never changed, and in practice the user instead purchases a completely new roller conveyor where the new type of rollers are assembled from the beginning. This also results in waste of roller conveyors which are difficult to reuse in other applications.

SUMMARY

The present invention concerns a roller conveyor that solves the problems of the known technology by that the roller conveyor, with the subsequent patent claims specified characteristics, can be used for several different dimensions of racks and other material handling systems. The roller conveyor includes an inner and outer profile and roller organs, such as wheels, which are assembled to a connecting organ, such as for example rubber strip.

The roller conveyor includes an inner and an outer profile of which the inner profile can run freely in the outer profile, and thus creating a telescopic function.

According to one embodiment, the inner and outer profile is in the form of a c-profile where the width of the opening is equally wide on both the inner and outer profile. The opening side also includes recesses which are designed to receive the axle that the roller organs are assembled to. The distance between the recesses on the profile determines the distance between the roller organs in the roller conveyor.

According to one embodiment, the roller organs are assembled to an axle which is intended to be placed in the recesses on the inner and outer profiles. When the axle has been placed in the recess, the axle also locks the inner and outer profile to each other in its longitudinal direction.

According to one embodiment either end of the roller organ's axle is assembled to a connecting organ. The axles are assembled to the connecting organ with a distance equal to the distance between the recesses on the profiles in order for the roller organs to be assembled and disassembled in the entire profile's length simultaneously.

Furthermore, a telescopic roller conveyor frame is provided for allowing the alteration of the size of an entire roller conveyor, in length and/or in width. The telescopic roller conveyor frame comprises at least one first telescopic roller conveyor frame part comprising an outer profile comprising at least one recess or hole, and an inner profile comprising at least one recess or hole. The inner profile is adapted to be telescopically placed at least partially inside the outer profile. The telescopic roller conveyor frame further comprises at least one second telescopic roller conveyor frame part comprising an outer profile and an inner profile adapted to be telescopically placed at least partially inside the outer profile. The first and second roller conveyor frame parts are adapted to be connected by a roller conveyor comprising at least one roller organ, a first portion adapted to be placed in the at least one recess or hole of the inner and outer profiles of the first telescopic roller conveyor frame part, for locking the inner and outer profile, and a second portion adapted to be placed in the at least one recess or hole of the inner and outer profiles of the second telescopic roller conveyor frame part, for locking the inner and outer profile, such that the first and second roller conveyor frame parts are connected and locked.

According to one embodiment of the telescopic roller conveyor frame, the first and second roller conveyor frame parts additionally are connected by means of additional frame parts connected to the end portions of the inner and/or outer profiles for connecting the first and second roller conveyor frame parts at a distance defined by the additional frame parts, substantially parallel to each other.

According to one embodiment, the additional frame parts are telescopic for adjusting the distance between the first and second frame parts.

According to one embodiment, the roller conveyor adapted to connect the first and second roller conveyor frame part is a telescopic roller conveyor, for example the telescopic roller conveyer described in any of the embodiments herein. The locking of the telescopic roller conveyor may lock the telescopic function of the additional frame part, such that both the telescopic roller conveyor and the telescopic roller conveyor frame may be locked by means of gravity.

Note that the invention can be combined freely within the scope of the patent claims.

BRIEF DESCRIPTION OF THE FIGURES

The invention is described in detail below by means of exemplifying embodiments with reference to the enclosed drawings in which.

DETAILED DESCRIPTION

Figure 1:
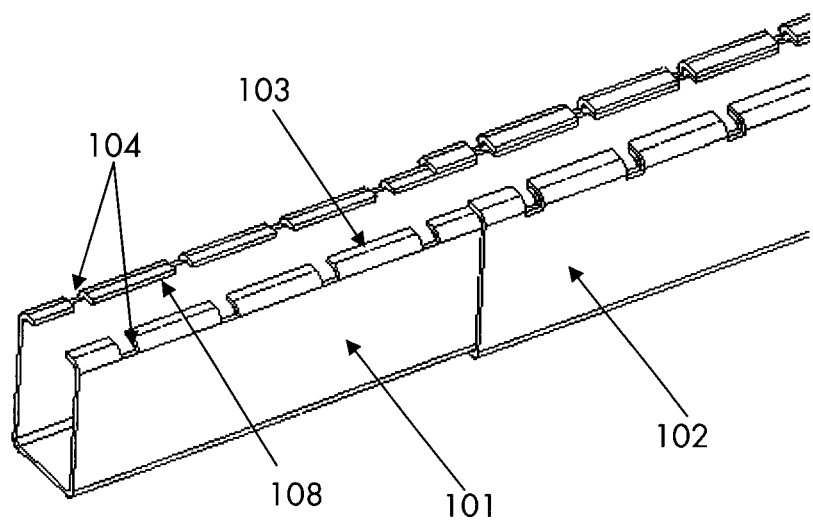
FIG. 1 shows an inner profile and an outer profile of a roller conveyor.

In the following, a description of embodiments will be made with reference to the enclosed drawings. It should be noted that the figures are only for illustrating embodiments and shall not be considered to limit the scope of protection. Directional specifications shall be viewed only as directional specifications in the drawings.

By means of a telescopic roller conveyor different lengths of roller conveyors can be created by that the profile to which the roller organs are assembled, includes a telescopic function. The modular based design allows rebuilding of e.g. a rack very easily and enables the roller conveyor to be reused even if the dimensions of the rack are changed.

According to one embodiment, the telescopic roller conveyor includes three different modules; inner profile, outer profile and connection organ with roller organs.

An inner profile and an outer profile combined with a connection organ with roller organs, creates a telescopic roller conveyor.

FIG. 1 shows the inner profile 101 and the outer profile 102 according to one embodiment, in which the profiles are in the form of a C-profile. The inner profile 101 can run inside the outer profile 102, and thereby create a telescopic function.

In alternative embodiments, the profiles 101, 102 can be in any other geometry as long as the inner profile 101 can run freely in the outer profile 102 and as long as there are recesses for axles and roller organs.

The profiles 101, 102 has a first side 103 comprising at least one first recess 108 where the width of the recess is equally wide on the inner profile 101 as on the outer profile 102. The width of the recess determines the maximum width of the roller organs that can be assembled to the profiles.

In alternative embodiments the roller organs may comprise e.g. wheels, rollers or balls.

The first side 103 of the profiles 101, 102 comprises at least a second recess 104 intended to receive the axle 105 to which the roller organs 106 are assembled. The other recesses 104 are separated by the same distance as the distance between the roller organs' 106 center in the roller conveyor. The distance between the other recesses 104 also determines the maximum diameter of the roller organs 106 that can be assembled to the profiles.

When the roller organ 106 with its axle 105 is placed in the profiles' other recesses 104, the profiles are locked to each other in the longitudinal direction.

Figure 2:
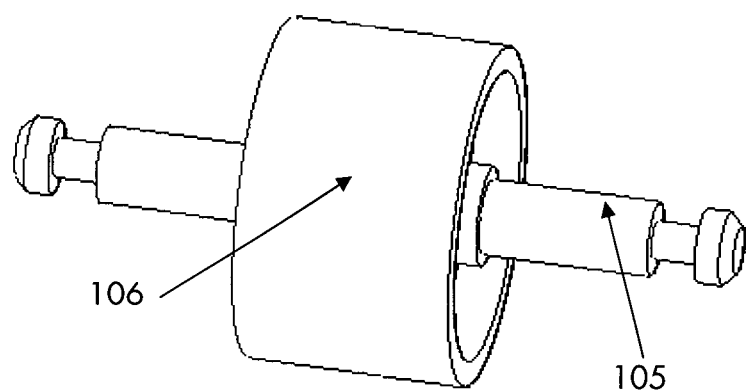
FIG. 2 shows a roller organ with an axle.

FIG. 2 shows a roller organ 106, in the form of a wheel, with an axle 105.

Figure 3:
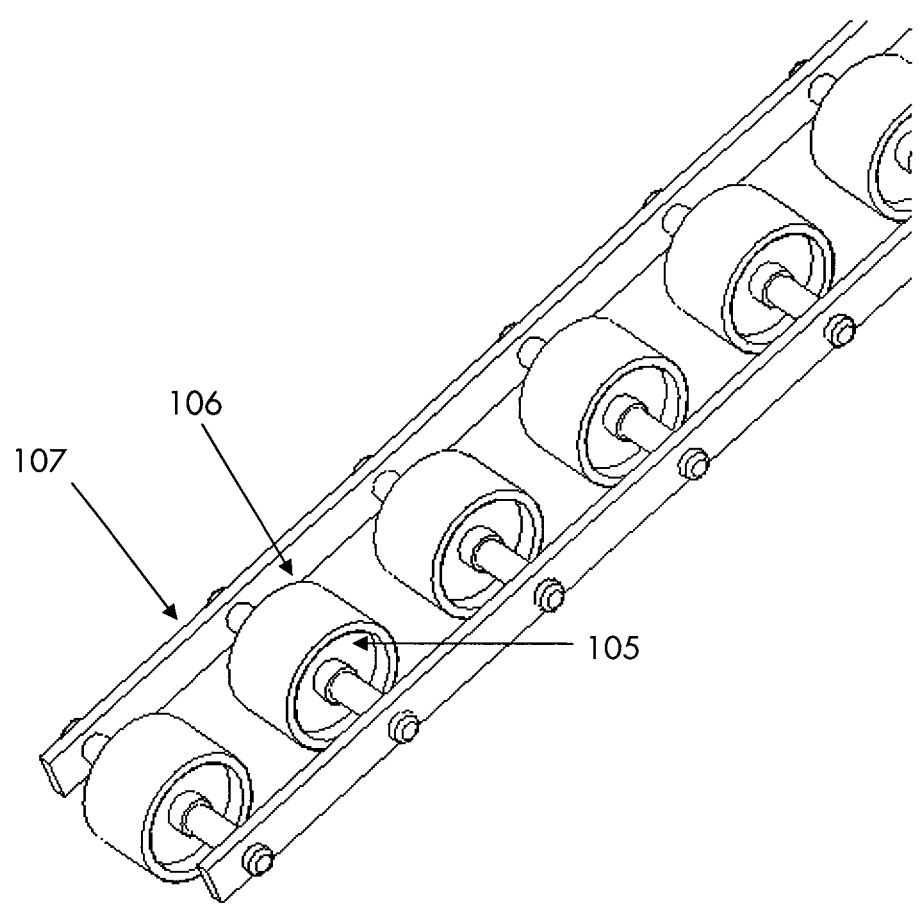
FIG. 3 shows a roller organ with an axle assembled to a connecting organ.

FIG. 3 shows a roller organ 106 in the form of a wheel with an axle 105. assembled to a connecting organ 107. The roller organ 106 with the axle 105 is assembled to the connecting organs 107 with the same distance as between the other recesses 104 on the profiles. By having roller organs 106 with axle 105 assembled to a connecting organ 107, all roller organs 106 with axle 105 can be assembled or disassembled to the profiles simultaneously. Although the connecting organs have been cut in order to be adjusted for the length of the roller conveyor, it is always possible to reuse the connecting organs by placing several connecting organs 107 containing roller organs 106 and axle 105, along the length of the profiles.

The roller organs being assembled to a connecting organ 107 may e.g. refer to that they are connected with string, tape, elastic band or anything else that intends to link the wheels together with a predetermined distance from each other.

Figure 4:
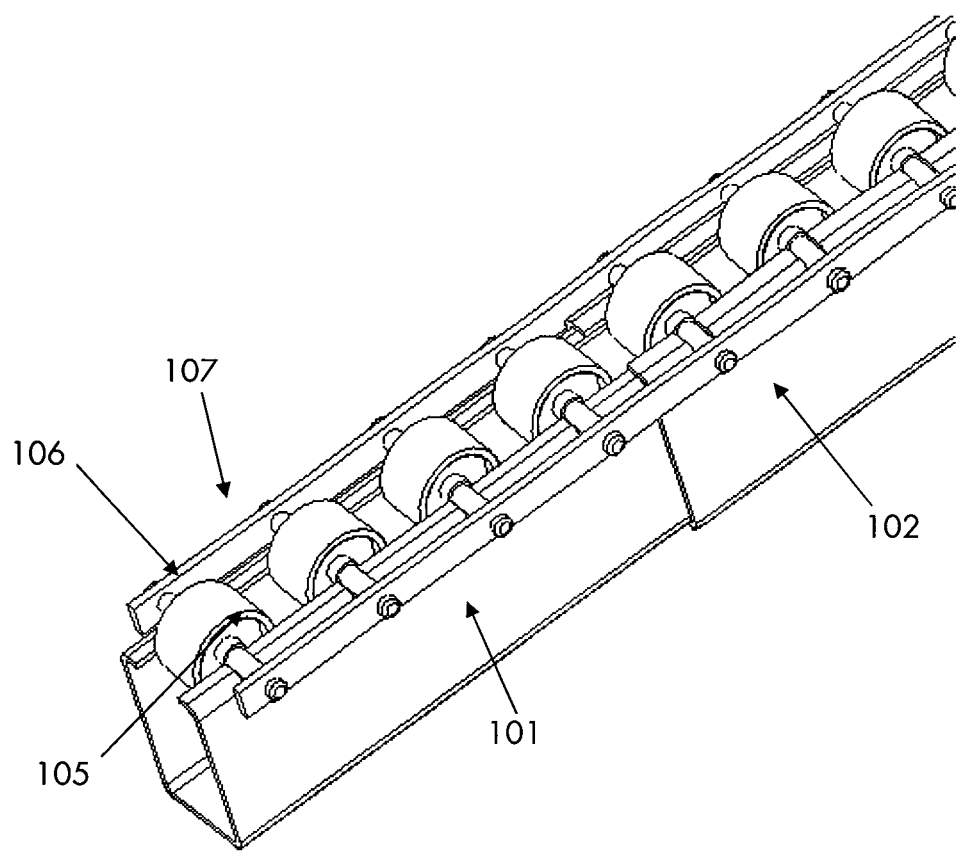
FIG. 4 shows a connecting organ with a roller organ assembled to the profiles.

FIG. 4 shows the assembled roller conveyor, characterized by the telescopic roller conveyor including an inner profile 101, and an outer profile 102, wherein the inner profile 101 is designed to run inside the outer profile 102 so that the telescopic function is obtained, and wherein the inner profile 101 and the outer profile 102 at a first side 103 comprises: at least a first recess 108 designed to partially contain a roller organ 106, and a second recesses 104 designed to receive an axle 105 connected to the roller organ 106, and wherein the axle 105 is designed to lock the inner profile 101 and the outer profile 102 to each other in the profiles' 101; 102 longitudinal direction.

According to one embodiment, the telescopic roller conveyor can, as described above, have other recesses 104 designed to partially contain a wheel assembled on the axle 105.

According to one embodiment, the telescopic roller conveyor can, as described above, have a first side 103 comprising a longitudinal slit 108 with a width intended to partially contain the roller organ 106.

According to one embodiment, the telescopic roller conveyor can include at least two axles 105, each one connected to the roller organs 106 as described above, wherein the axles 105 include a first and second end, and wherein at least one of the first and the second ends are assembled to a connecting organ 107 at the same distance as the recesses 104 in the inner profile 101 and the outer profile 102, so that at least two axles 105 and roller organs 106 on the roller conveyor's length can be assembled and disassembled to the profiles 101; 102 simultaneously.

Further, the invention includes a material rack comprising telescopic roller conveyor as described above.

Figure 5:
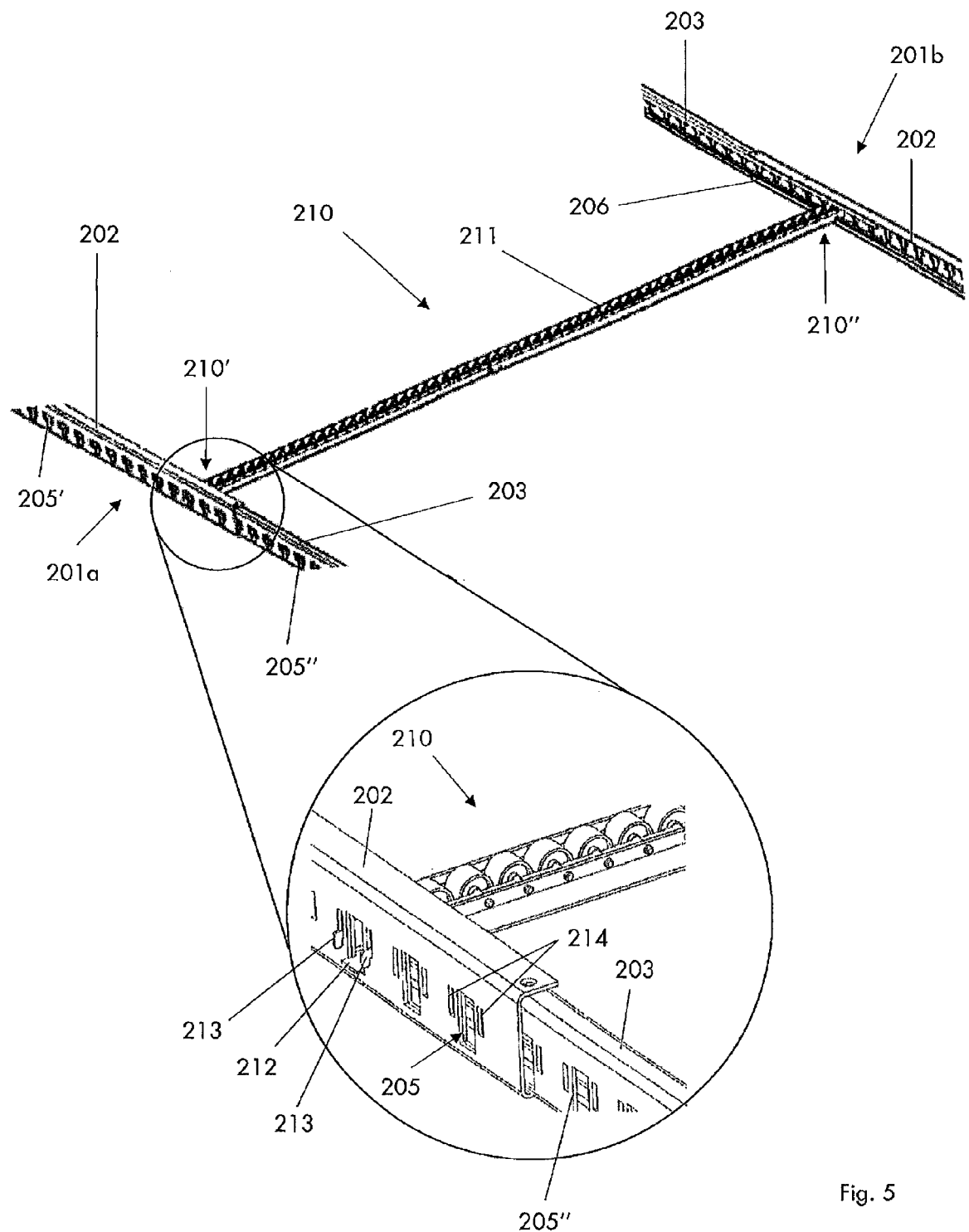
FIG. 5 shows an embodiment of a telescopic roller conveyor frame.

FIG. 5 shows a telescopic roller conveyor frame. The telescopic conveyor frame enables adaptations of the size of the roller conveyor for the particular circumstances. The frame may be adjustable in length and/or width and may comprise a telescopic roller conveyor, as described above, or a roller conveyor of fixed length. The telescopic roller conveyor comprises a first telescopic roller conveyor frame part 201a comprising an outer profile 202 comprising at least one recess or hole 205'. The first telescopic roller conveyor frame part 201a further comprises an inner profile 203 comprising at least one recess or hole 205", which is adapted to be aligned with the recess or hole 205' for creating an aligned hole or recess 205. The inner profile 203 is adapted to be telescopically placed at least partially inside the outer profile 202. The telescopic roller conveyor frame further comprises a second telescopic roller conveyor frame part 201b correspondingly comprising an outer and inner profile each having at least one recess or hole in the same way as described under reference to the first roller conveyor frame part. In the embodiment shown in FIG. 5, the inner profile is locked in the outer profile by means of a locking protrusion 206 of the outer profile, however, in other embodiments it is equally conceivable that the locking protrusion is a portion of the inner profile, or that the locking protrusion is omitted.

The first and second roller conveyor frame parts 201a, 201b are adapted to be connected by a roller conveyor 210 comprising at least one roller organ 211. The roller conveyor comprises 210 a first portion 210' adapted to be placed in the hole 205 of the inner 203 and outer 202 profiles of the first telescopic roller conveyor frame part 201a, for locking the inner 203 and outer 202 profile. The roller conveyor further comprises a second portion 210" adapted to be placed in the hole of the inner 203 and outer 202 profiles of the second telescopic roller conveyor frame part 201b, for locking the inner 203 and outer 202 profile. The first and second portions according to the embodiments shown on FIG. 5 comprises a main protrusion 212 adapted to be placed in a main hole of the inner 203 and outer 202 profiles, and two supporting protrusions 213 placed in additional holes 214 in the inner 203 and outer 202 profiles and comprising angular latching portions for additionally locking the first 210' and second 210" portions of the roller conveyor to the profiles.

The connection of the roller conveyor frame parts 201a, 201b by the roller conveyor 210 makes sure that the first 201a and second 201b roller conveyor frame parts are connected and locked.

Figure 6:
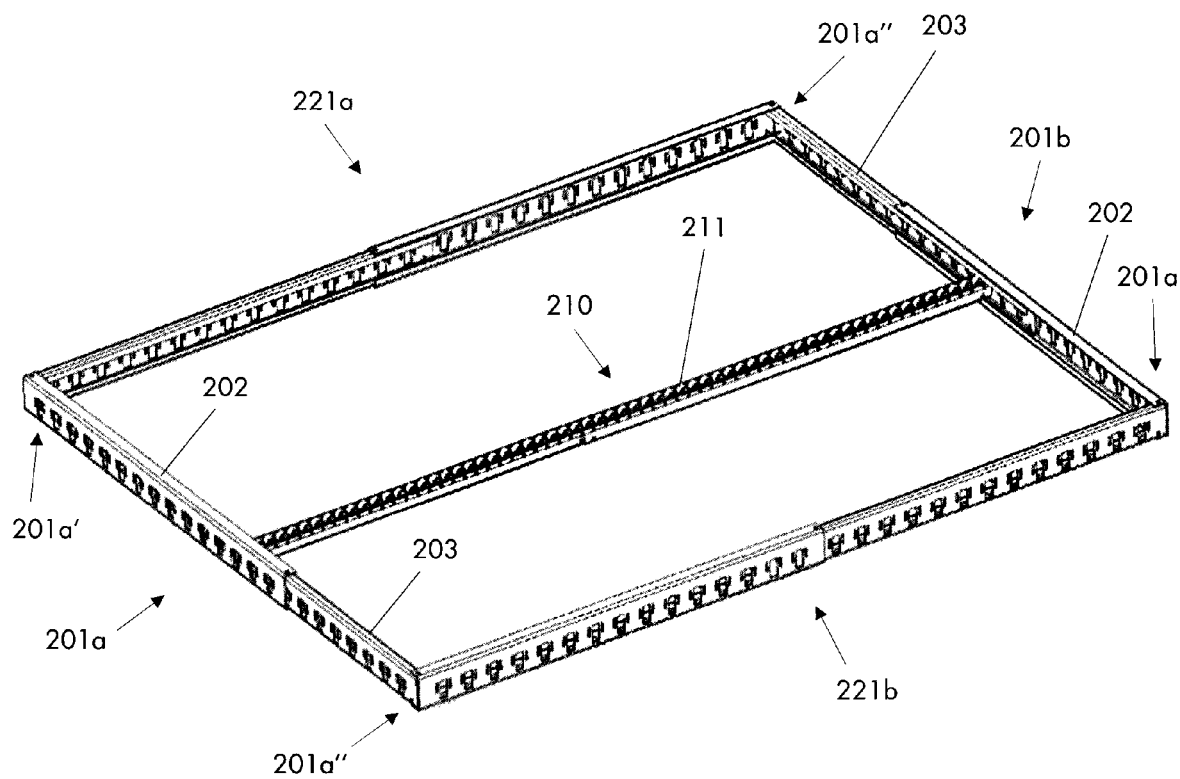
FIG. 6 shown another embodiment of a telescopic roller conveyor frame.

FIG. 6 shows the telescopic roller conveyor frame according to an embodiment in which the first and second roller conveyor frame parts additionally are connected by means of additional frame parts 221a; 221b connected to the end portions 201a'; 201a" of the inner 203 and/or outer 202 profiles for connecting the first 201a and second 201b roller conveyor frame parts at a distance defined by the additional frame parts 221a; 221b, substantially parallel to each other. According to the embodiment shown in FIG. 6, the additional frame parts 221a; 221b are telescopic for adjusting the distance between the first 201a and second 201b frame parts. Correspondingly, the roller conveyor 210 is a telescopic roller conveyor such that the distance between the first 201a and second 201b frame parts can be adjusted. The roller conveyor displayed in FIG. 6 could for example be the roller conveyor disclosed under reference to FIGS. 1-4, which enables the locking of the telescopic function of the roller conveyor to be achieved by means of the locking of the telescopic roller conveyor, such that both the telescopic roller conveyor and the telescopic roller conveyor frame may be locked by means of gravity.

The abovementioned description of embodiments shall not be understood as limiting, but can be freely combined within the scope of the claims.

The invention claimed is:

1. A telescopic roller conveyor, characterized in that the telescopic roller conveyor comprises:
    an inner profile, and
    an outer profile, wherein
        the inner profile is adapted to slide inside the outer profile, such that a telescopic functionality is achieved, and
        the inner and outer profiles each have a first side comprising:
            at least one first recess adapted to partly contain at least one roller organ, wherein the first recess comprises a slit extending along the length axis of the telescopic roller conveyor in a rotational direction of the at least one roller organ, and
            at least one second recess connected to the first recess and extending in the axial direction of the at least one roller organ, perpendicularly to the extension of the slit, and wherein the second recess is adapted to receive an axle connected to the roller organ,
        wherein the axle is adapted to lock the inner and outer profiles to each other in the length axis of the inner and outer profiles, when the axle is placed in the second recess.

2. The telescopic roller conveyor according to claim 1, wherein the recess of the first side has a width adapted to at least partially contain the roller organ.

3. The telescopic roller conveyor according to claim 1, wherein the telescopic roller conveyor comprises at least two axles each one connected to the roller organ, wherein each axle comprises a first end and a second end, and wherein at least one of the first and second ends is mounted to a connecting organ on substantially the same distance as the recesses in the inner profile and the outer profile, such that at least two axles and the roller organs on the length of the roller conveyor can be mounted to or dismounted from the inner and outer profiles simultaneously.

4. A telescopic roller conveyor frame comprising:
    at least one first telescopic roller conveyor frame part comprising:
        a first outer profile comprising at least one recess or hole, and
        a first inner profile comprising at least one recess or hole, wherein the first inner profile is adapted to be telescopically placed at least partially inside the first outer profile, and
    at least one second telescopic roller conveyor frame part comprising:
        a second outer profile, and
        a second inner profile adapted to be telescopically placed at least partially inside the second outer profile, wherein
        the telescopic roller conveyor frame further comprises a telescopic roller conveyor extending perpendicularly to the length extension of the first and second telescopic roller conveyor frame parts and connecting the first and second roller conveyor frame parts, the telescopic roller conveyor comprising:
            at least one roller organ,
            a first portion adapted to be placed in the at least one recess or hole of the inner and outer profiles of the first telescopic roller conveyor frame part, for locking the inner and outer profile, and
            a second portion adapted to be placed in the at least one recess or hole of the inner and outer profiles of the second telescopic roller conveyor frame part, for locking the inner and outer profile, such that the first and second roller conveyor frame parts are connected and locked.

5. The telescopic roller conveyor frame according to claim 4, wherein the first and second telescopic roller conveyor frame parts are connected by additional frame parts connected to the end portions of the inner and/or outer profiles, the distance between the first and second telescopic roller conveyor frame parts is defined by the additional frame parts, and the first and second telescopic roller conveyor frame parts are substantially parallel to each other.

6. The telescopic roller conveyor frame according to claim 5, wherein the additional frame parts are telescopic for adjusting the distance between the first and second telescopic roller conveyor frame parts.

7. The telescopic roller conveyor frame according to claim 4, wherein the roller conveyor is a telescopic roller conveyor.

8. The telescopic roller conveyor frame according to claim 7, wherein the telescopic roller conveyor is a telescopic roller conveyor according to claim 1.

9. The telescopic roller conveyor frame according to claim 8, wherein the first and second telescopic roller conveyor frame parts additionally are connected by means of additional frame parts connected to the end portions of the inner and/or outer profiles for connecting, the distance between the first and second telescopic roller conveyor frame parts at a distance is defined by the additional frame parts, and the first and second telescopic roller conveyor frame parts are substantially parallel to each other, and wherein the locking of the telescopic roller conveyor locks the telescopic function of the additional frame part.

10. The telescopic roller conveyor frame according to claim 7, wherein the telescopic roller conveyor is a telescopic roller conveyor according to claim 2.

11. The telescopic roller conveyor frame according to claim 10, wherein the first and second telescopic roller conveyor frame parts additionally are connected by means of additional frame parts connected to the end portions of the inner and/or outer profiles for connecting, the distance between the first and second telescopic roller conveyor frame parts at a distance is defined by the additional frame parts, and the first and second telescopic roller conveyor frame parts are substantially parallel to each other, and wherein the locking of the telescopic roller conveyor locks the telescopic function of the additional frame part.

12. The telescopic roller conveyor frame according to claim 7, wherein the telescopic roller conveyor is a telescopic roller conveyor according to claim 3.

13. The telescopic roller conveyor frame according to claim 12, wherein the first and second telescopic roller conveyor frame parts additionally are connected by means of additional frame parts connected to the end portions of the inner and/or outer profiles for connecting, the distance between the first and second telescopic roller conveyor frame parts at a distance is defined by the additional frame parts, and the first and second telescopic roller conveyor frame parts are substantially parallel to each other, and wherein the locking of the telescopic roller conveyor locks the telescopic function of the additional frame part.

* * * * *